(12) United States Patent
Yano (10) Patent No.: US 10,428,548 B2
(45) Date of Patent: Oct. 1, 2019

(54) UNDERGROUND EVACUATION SHELTER (71) Applicant: SHELTER JAPAN Co., Ltd., Hamamatsu-shi, Shizuoka (JP)

(72) Inventor: Akihiko Yano, Toyohashi (JP)

(73) Assignee: SHELTER JAPAN CO., LTD., Hamamatsu-Shi, Shizuoka (JP)

(*) Notice: Subject to any disclaimer, the term of this patent is extended or adjusted under 35 U.S.C. 154(b) by 0 days.

(21) Appl. No.: 15/580,886

(22) PCT Filed: Jun. 10, 2016

(86) PCT No.: PCT/JP2016/002812
§ 371 (c)(1),
(2) Date: Dec. 8, 2017

(87) PCT Pub. No.: WO2016/199431
PCT Pub. Date: Dec. 15, 2016

(65) Prior Publication Data
US 2018/0163424 A1 Jun. 14, 2018

(30) Foreign Application Priority Data
Jun. 12, 2015 (JP) .................................. 2015-118794

(51) Int. Cl.
*E04H 9/02* (2006.01)
*E04H 9/14* (2006.01)
(Continued)

(52) U.S. Cl.
CPC ............. *E04H 9/028* (2013.01); *E04B 1/343* (2013.01); *E04H 9/029* (2013.01); *E04H 9/08* (2013.01);
(Continued)

(58) Field of Classification Search
CPC . E04H 9/028; E04H 9/14; E04B 1/343; E03F 5/02; E03F 5/101; E02D 29/12;
(Continued)

(56) References Cited

U.S. PATENT DOCUMENTS 3,159,117 A * 12/1964 Rosenfeld ................. E04H 9/12
109/1 S
3,258,885 A * 7/1966 Lodge ....................... B66B 9/00
187/414
(Continued)

FOREIGN PATENT DOCUMENTS

| DE | 102010006992 A1 * | 8/2011 | ............. E02D 29/12 |
| JP | 3178495 U | 8/2012 | |

(Continued)

OTHER PUBLICATIONS

International search report from International Application No. PCT/JP2016/002812 dated Aug. 2, 2016.

*Primary Examiner* — Basil S Katcheves
*Assistant Examiner* — Omar F Hijaz
(74) *Attorney, Agent, or Firm* — Brundidge & Stanger, P.C.

(57) ABSTRACT

The purpose of the invention is to reduce a cost and a construction period, secure measures for stability of the shelter main body against a tsunami, water pressure resistant performance against the tsunami generated by the Nankai Trough Great Earthquake, safety performance necessary for using the evacuation shelter, and good living comfort, and shorten evacuation time.

The shelter main body 3 is connected to the concrete foundation 2 and has a structure with the frame 3a of a columnar structure, the ceiling 3b, and the internal space 9 of a columnar structure. The inner hatch 5 is attached to the periphery of the opening 4 provided in the ceiling 3b by a hinge in an openable and closable manner. A rising portion (Continued)

6 rises upward from the peripheral edge of the opening 4. The outer hatch 7 is connected to the upper surface of the rising portion 6 by a hinge 7a in an openable and closable manner. A pair of rails 8 is arranged in the vertical direction on the inner wall surface of the frame 3a of a columnar structure of the shelter main body 3. The movable floor 10 is capable of moving up and down inside the internal space 9 along the rails 8.

4 Claims, 7 Drawing Sheets

(51) Int. Cl.
    *E04B 1/343*     (2006.01)
    *E02D 29/045*     (2006.01)
    *E04H 9/08*     (2006.01)

(52) U.S. Cl.
    CPC ............. *E04H 9/14* (2013.01); *E02D 29/045* (2013.01); *Y02A 50/14* (2018.01)

(58) Field of Classification Search
    CPC .... E02D 29/045; B65D 90/10; B65D 90/105; Y02A 50/14
    See application file for complete search history.

(56) References Cited

U.S. PATENT DOCUMENTS

| | | | | |
|---|---|---|---|---|
| 4,323,140 A | * | 4/1982 | Foscarini | ................ E02D 29/12 |
| | | | | 182/128 |
| 4,615,158 A | * | 10/1986 | Thornton | ............ E04B 1/34336 |
| | | | | 109/1 S |
| 2005/0045077 A1 | * | 3/2005 | Bober | .................... A47B 81/06 |
| | | | | 108/147 |

FOREIGN PATENT DOCUMENTS

| | | | | |
|---|---|---|---|---|
| JP | 2012-229594 | 11/2012 | | |
| JP | 2012-233385 | 11/2012 | | |
| JP | 2103-160037 | 8/2013 | | |
| JP | 2014-080847 | 5/2014 | | |
| WO | WO-2017142167 A1 | * | 8/2017 | ............... E04B 1/35 |

* cited by examiner

UNDERGROUND EVACUATION SHELTER

TECHNICAL FIELD

The present invention relates to an underground evacuation shelter for evacuation for disaster that can be installed adjacent to an existing building.

BACKGROUND ART

To prepare for the "Nankai Trough Great Earthquake" which is expected to occur soon, we will develop houses with shelters for evacuation as earthquake countermeasures and tsunami countermeasures. According to the Cabinet Office announcement on Aug. 29, 2012, about 6,400 people are expected to die due to tsunami and about 1,800 people are expected to die due to fire in the Nankai Trough Great Earthquake, in Aichi Prefecture. And 95,000 people are expected to die in neighboring Shizuoka prefecture. Compared with the assumption of the Central Disaster Prevention Council in 2003, the number of deaths announced by the Cabinet Office in 2013 has greatly increased by 13 times. Tsunami would kill 230,000 people, accounting for 70% of the total deaths. The awareness of earthquake and tsunami countermeasures has been increasing in recent years.

Various proposals have been made on a method of fixing a shelter to a foundation as shown in Patent References 1 to 4 and the like.

According to the invention of Patent Reference 1, a sliding door 1 that can withstand impulsive water pressure, a viewing window improved from a pressure resistant manhole, and a manhole 2 for auxiliary evacuation are installed on a wall/roof in a reinforced concrete shelter 6.

According to Patent Reference 2, a seismically isolated structure with a low-rise type building body 1 made of precast pre-stressed concrete as a material and having a general shape of reversed ship bottom is proposed. The foundation portion of the building body 1 is structured by digging down the ground, providing a solid foundation 2 made of reinforced concrete, forming a lattice frame 4a partitioning into an appropriate size on the solid foundation 2 via a plurality of seismic isolation devices 3, providing a base slab 4 filled with filling back earth X in a groove 4b partitioned by the frame 4a, and providing the building body 1 on the base slab 4.

According to Patent Reference 3, an underground shelter fixed to a concrete foundation 2 is proposed. The underground shelter has an escape entrance 6 at the top and and an shelter main body 3 made of nonconcrete material selected from a fiber reinforced plastic, carbon fiber, Kepler fiber, polycarbonate concrete, metal or combination thereof at the bottom, and the escape entrance 6 and the shelter main body 3 are connected by an escape hatch 5 and an escape tube 20.

According to Patent Reference 4, by raising the floor 12 of the evacuation room 3 from the ceiling lowermost portion 15 of the entrance 2 of the tsunami shelter main body 3, the seawater surface 13 invading into the interior at the time of the disaster does not enter the evacuation room 3, and the evacuees 16 are saved by discharge 14 of oxygen cylinders or air cylinders. Since the airtightness of the evacuation room 3 is not influenced by the opening and closing of the entrance door 8, there is no need to close the door 8 at the time of evacuation, and the entrance 2 is not blocked at the time of escape. Inventions have been proposed which have a function to withstand a collision 18 such as pressure of a tsunami and rubble washed by the tsunami by tilting the outer wall and providing sufficient self-weight of the tsunami shelter 1 itself and fixation to the ground 5.

CITATION LIST OF PATENT REFERENCE

Patent Reference 1: JP 2013-160037
Patent Reference 2: JU3178495
Patent Reference 3: JP2014-80847
Patent Reference 4: JP2012-233385

SUMMARY OF INVENTION

Technical Problem

However, the following inconveniences are pointed out in the prior art.

(1) When the space of the shelter is small, it is difficult for people to move and store goods in the internal space.

(2) The efficiency of opening and closing a hatch is insufficient.

(3) If there is a hatch inside, there is a danger that it might unexpectedly open and close.

(4) If cost and construction period are to be reduced, it would leave a problem in safety. Therefore there are problems that the cost remains high and the construction term remains long, and countermeasures do not spread to ordinary households. The proportion of households below the average income amount is 61.4% (2010 National Life Basic Study). Many of the people in this income group reside in rental houses and have many concerns about future burden of residential expenses. Many people do not own land and there is a need of land search.

(5) It has been impossible to meet the demands of people who has anxiety about earthquake and are unsatisfied with mere earthquake-resistant structure. It is necessary to secure measures for stability of the shelter main body against a tsunami caused by the Nankai Trough Great Earthquake, water pressure resistant performance against the tsunami generated by the Nankai Trough Great Earthquake, safety performance necessary for using the evacuation shelter, and good living comfort. As the awareness of the earthquake rises, the necessity for shelters is increasing even at individual houses. Given the arrival time to evacuation sites, needs should be high in families with elderly people, infants and physical disabilities.

(6) Conventional shelters are mostly large-sized. For example, if the construction area of a shelter exceeds 10 square meters, it is necessary to submit a confirmation application to the city office, and there is a problem of cost and complicated work.

(7) Mobile shelters floating by a tsunami and earthquake-resistant shelters against earthquake cannot stay in the place where people evacuate to, and can withstand neither earthquakes nor secondary disasters such as tsunami, fire and debris flow. Elderly people and people with physical disabilities cannot safely evacuate. It seems that a floating type shelter sways greatly in the muddy stream of the tsunami and does not have a stabilized habitability.

(8) When shelters are installed in certain places such as public institutions and large-scale facilities, there are disadvantageous inconveniences that you have to move to such a place in case of emergency. For recent natural disasters (earthquakes, tsunamis, debris flows etc.), it is difficult for elderly people, physically disabled people and infants, etc. to move to a designated evacuation site in a short time. Shelters for urgently escaping from a tsunami are being studied in order to deal with cases where evacuation time cannot be secured before the arrival of the tsunami. Kochi Prefecture has decided to set up a tsunami evacuation shelter in Muroto City in preparation for the occurrence of the Nankai Trough Great Earthquake. They are considering about constructing facilities consisting of tunnels and vertical shafts in cliff areas of settlements in Muroto city. However, it sometimes takes more than 10 minutes from home to evacuation site, and it takes further more time for elderly people and physically disabled people. Also, it is difficult to climb an evacuation tower and the like by themselves. There is also a shelter of the type floating adjacent to the house, but it is expected that it will be difficult to be searched after being washed by a tsunami.

(9) They do not assume the case when people suffered a tsunami on the premise that people should evacuate to a place higher than the height of the tsunami.

(10) Although the capacity is large, it is doubtful whether all local residents can evacuate.

Solution to Problem

In view of the above-described problems, the present invention provides an underground evacuation shelter including a shelter main body connected to a concrete foundation. The shelter main body has a frame of a columnar structure and a ceiling. An internal space of said shelter main body has a columnar structure. The shelter also includes, a hatch of a double structure including an outer hatch and an inner hatch provided on the ceiling, and a movable floor capable of ascending and descending inside the internal space along rails arranged vertically in the shelter main body.

It is preferable that the outer hatch and the movable floor are connected by a link mechanism, and the outer hatch is interlocked with said movable floor while the ascending and descending of the movable floor.

It is preferable that the movable floor is movable up and down from an upper stage to a middle stage of the shelter main body.

It is preferable that the shelter includes an inner hatch fixing rod arranged in a vertical direction for supporting the inner hatch, the inner hatch fixing rod passes through the movable floor, an upper end portion of said inner hatch fixing rod supports the inner hatch, and a lower end portion of said inner hatch fixing rod is in contact with a bottom surface of the shelter main body.

It is possible to divide the internal space into two layers with the movable floor.

It is preferable that the underground evacuation shelter is capable of withstanding water pressure of 20 m of water depth and has a residential environment set to allow survival for at least 3 days in a sealed state.

Advantageous Effects of Invention

The present invention has the following effects.

(1) Since the movable floor is provided in the internal space, it is easy for people to move inside, and the internal space can be used efficiently.

(2) Since the outer hatch and the movable floor are connected by a link mechanism, the opening and closing efficiency of the hatch is increased.

(3) Since the inner hatch fixing rod for supporting the inner hatch is provided, it is possible to prevent the inner hatch from unexpectedly opening and closing for high safety.

(4) The shelter can be constructed as a set with a house to reduce the cost.

(5) By reducing the size of the shelter main body, it is possible to reduce the construction area of the shelter, it is thus possible to omit the confirmation application to the city government, and to reduce the time and labor for building.

(6) The shelter stays in the place where people evacuate to and is capable of withstanding not only earthquakes but also secondary disasters such as tsunami, fire, and debris flow. Even elderly people and physically disabled people can safely evacuate. It can provide innovative and more reliable performance with high necessity in society.

(7) Since the shelter can be placed adjacent to a private home such as their own home, people can get in and out from the above-ground in emergency and evacuate immediately.

(8) Since the shelter is adjacent to the residence, people can evacuate in a short time. For example, because it is adjacent to home, people can evacuate in a short time even in an emergency.

(9) The shelter provide a safe and secure housing that eliminates concerns about tsunami for people who live in coastal areas or are planning to live there in the future.

DESCRIPTION OF EMBODIMENTS

Figure 1:
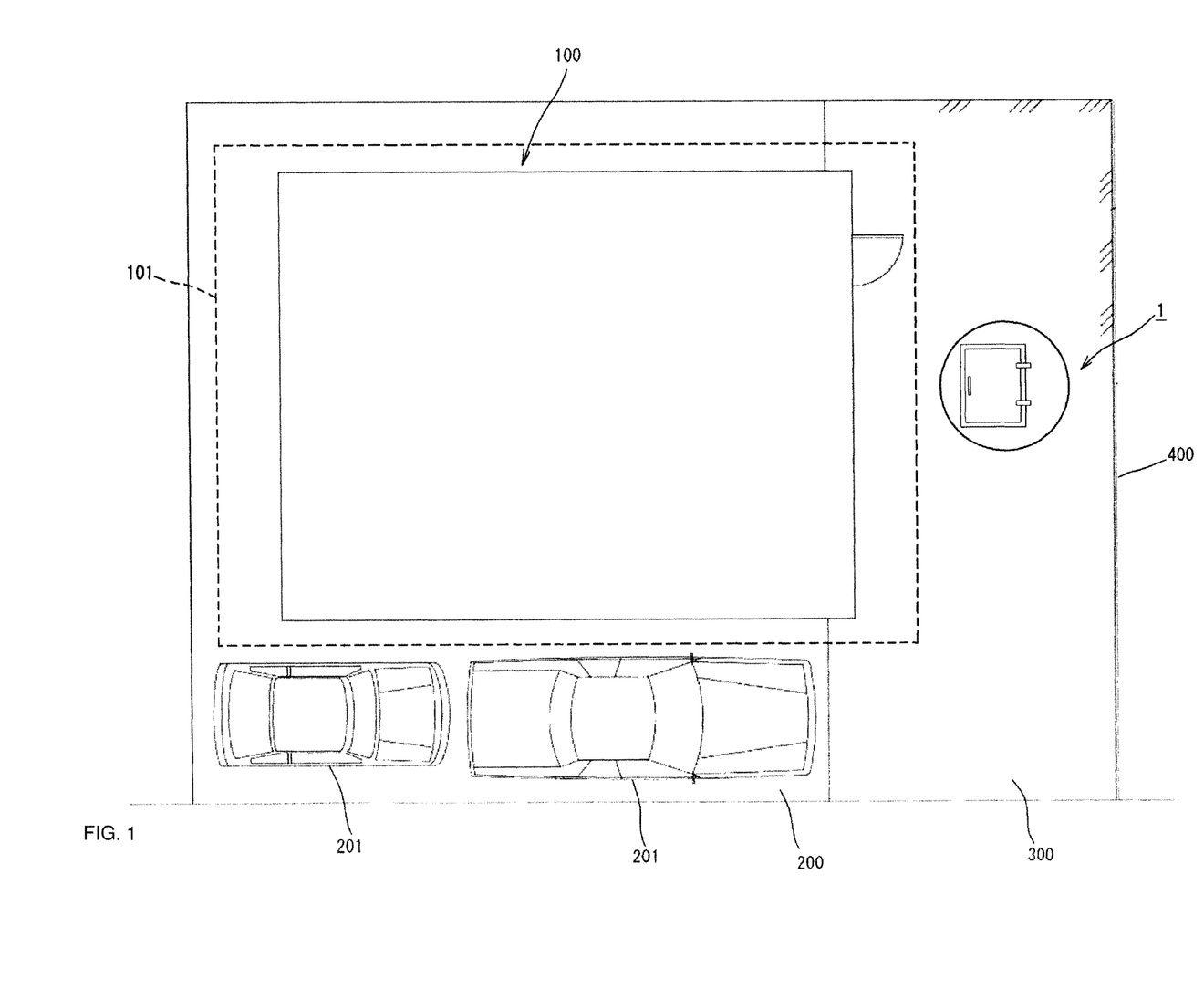
FIG. 1 is a plan view of a site on which an underground evacuation shelter 1 according to an embodiment of the present invention is installed.
Figure 2:
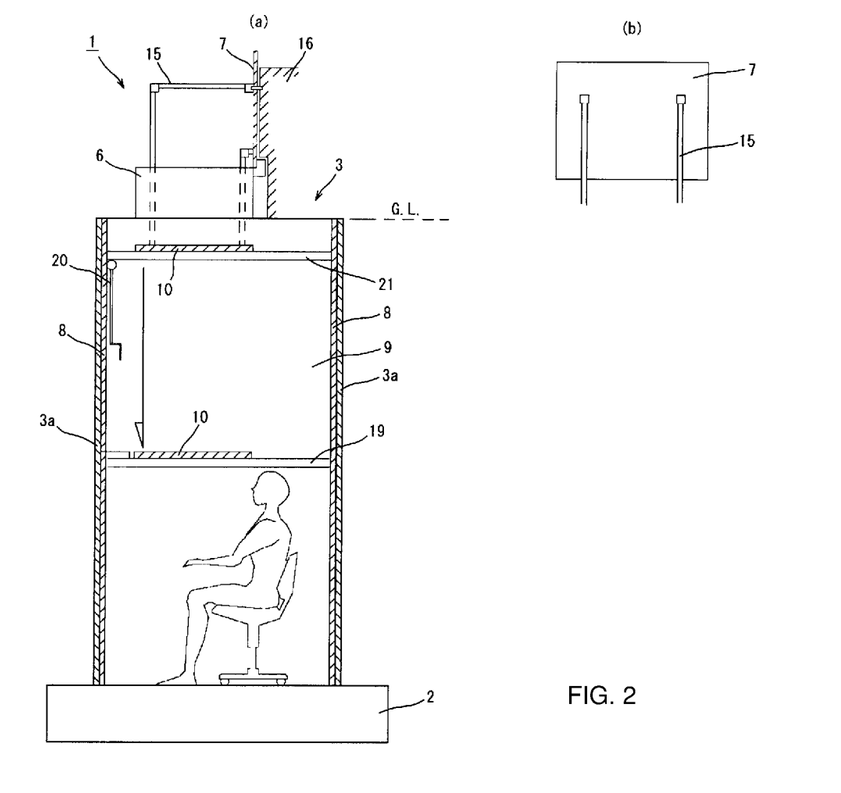
FIG. 2(a) is a front sectional view showing the internal structure of the underground evacuation shelter 1 according to the embodiment of the present invention.
FIG. 2(b) is a partial side view of the same in which the outer hatch 7 and the link mechanism 15 are connected.
Figure 3:
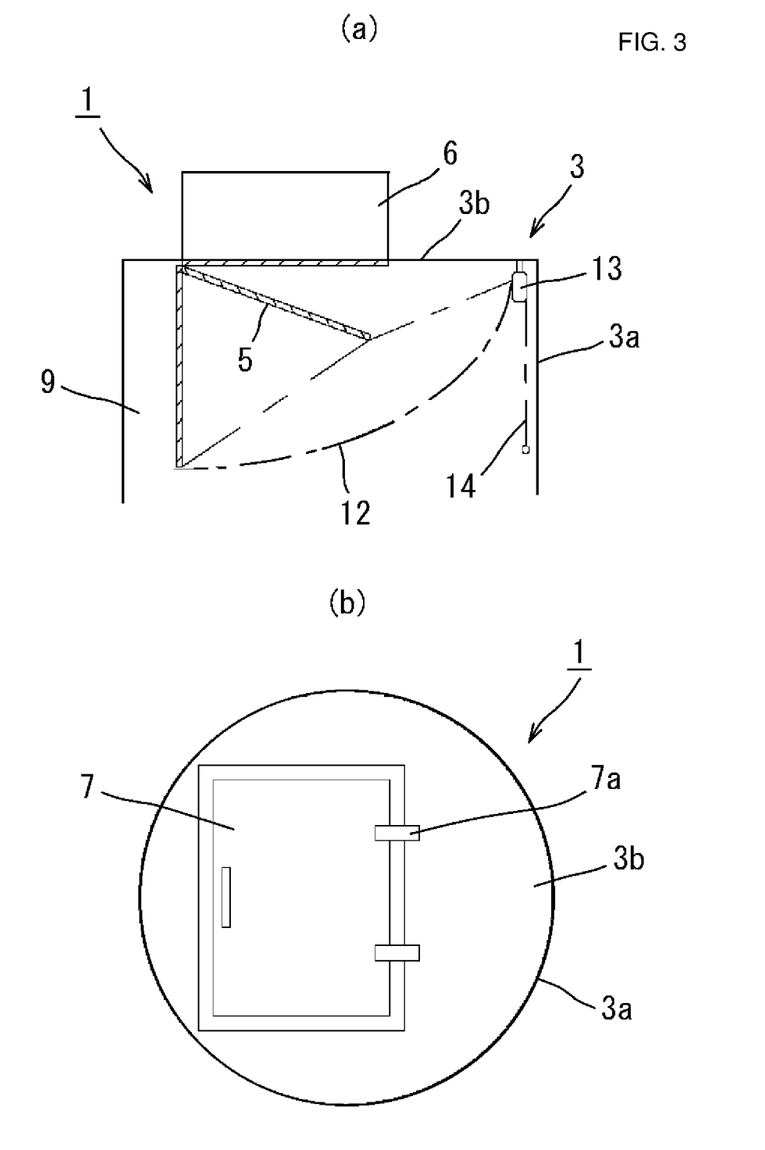
FIG. 3(a) is an explanatory view showing the operation of the inner hatch 5 of the embodiment of the present invention.
FIG. 3(b) is a plan view of the underground evacuation shelter 1.
Figure 4:
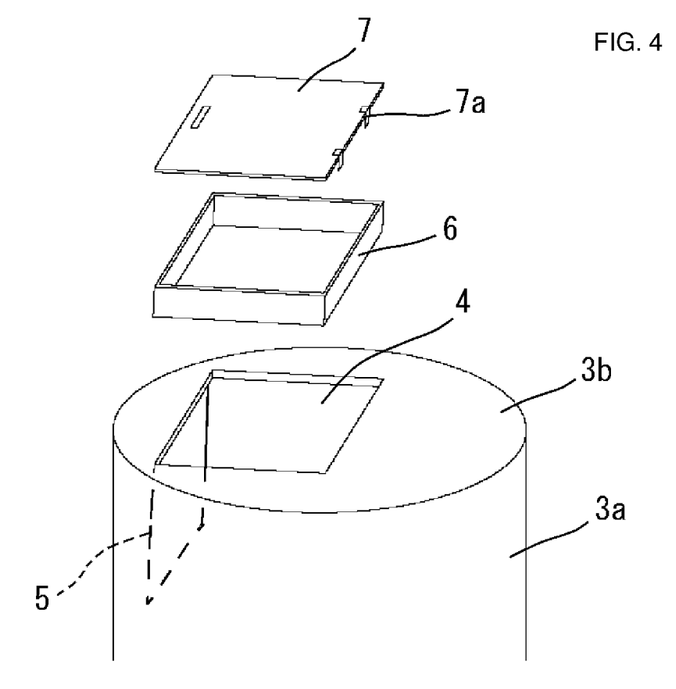
FIG. 4 is an exploded perspective view of the upper part of the underground evacuation shelter 1.
Figure 5:
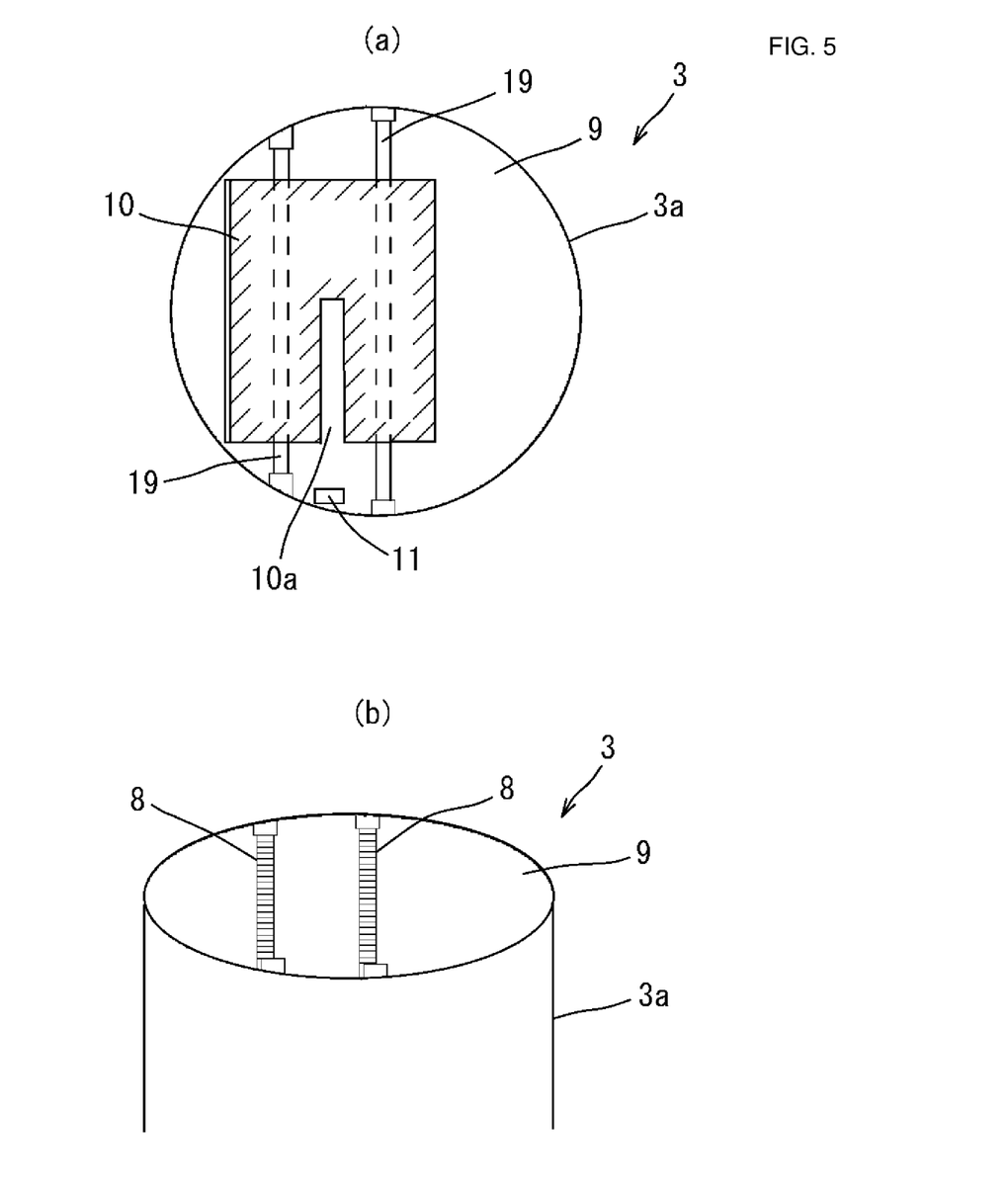
FIG. 5(a) is a plan view showing an installed state of the floor plate according to the embodiment of the present invention.
FIG. 5(b) is a perspective view showing the installed state of the rails 8 for moving the floor plate.
Figure 6:
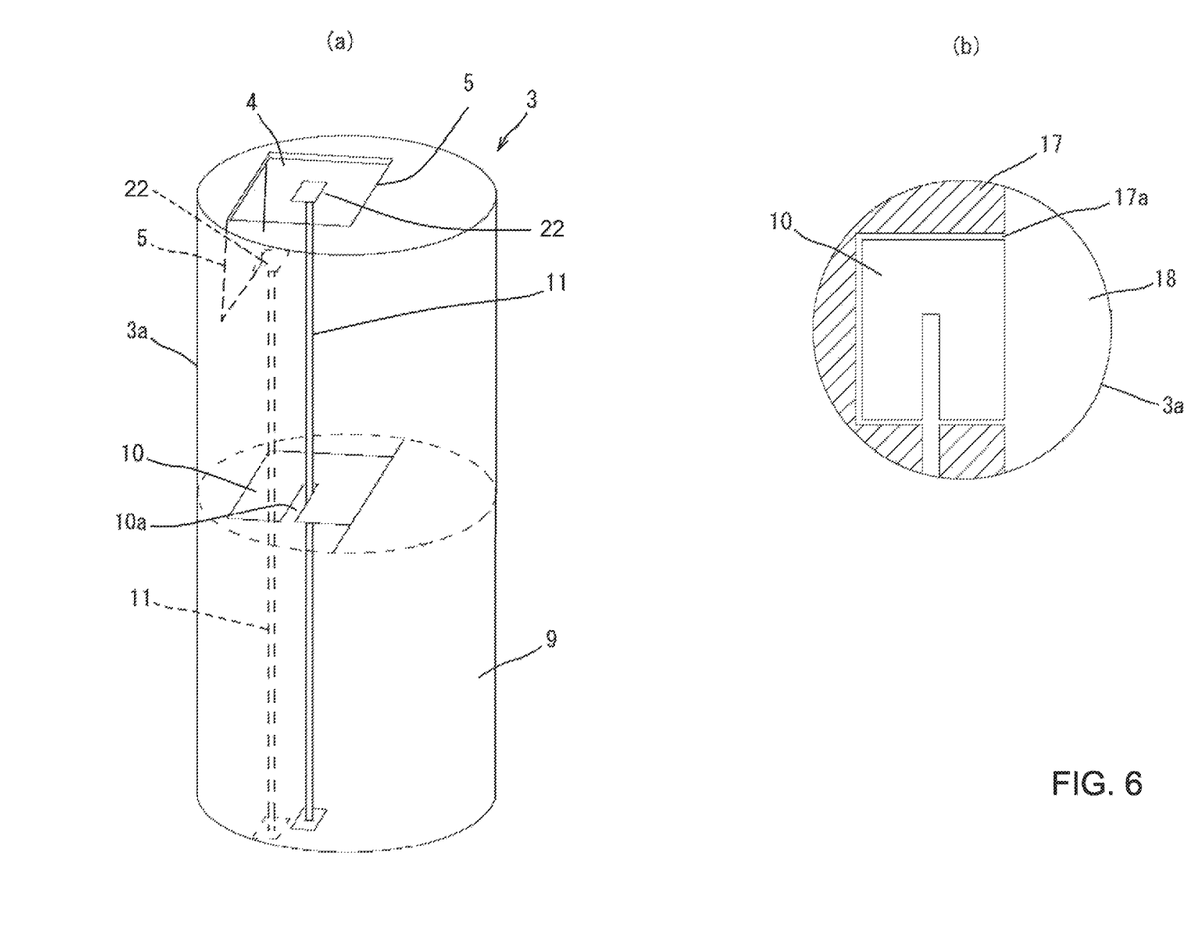
FIG. 6(a) is a perspective view showing an installed state of the inner hatch fixing rod 11 according to the embodiment of the present invention.
FIG. 6(b) is a plan view showing the position of the floor plate fixing plate.

Preferred embodiments of the present invention will be described with reference to the drawings. As shown in FIGS. 1 to 3, an underground evacuation shelter 1 (hereinafter referred to as a shelter 1) according to an embodiment of the present invention is provided with a shelter main body 3 fixedly attached to a concrete foundation 2. It is also possible to connect the rebars of the concrete around the shelter 1, the rebars of the concrete foundation 2 and the rebars of the reinforced concrete substructure 101 of the house 100. This prevents the subsidence caused by the liquefaction phenomenon at seismic intensity 7 of the assumed Nankai Trough Great Earthquake. For illustration here, the land area is 40 tsubo(132 m$^2$), first floor area is 15 tsubo(50 m$^2$), second floor area is 15 tsubo(50 m²), and the total floor area is 30 tsubo(99 m²). The thickness of the concrete foundation 2 is 150 mm. In addition to the house 100, a parking lot 200 is provided in the premises for automobiles 201. In addition, the shelter 1 is provided in the opening of a reinforced concrete structure 300 provided in the outer peripheral region of the house 100. A fence 400 is appropriately provided around the reinforced concrete structure 300. The reinforced concrete structure 300 is connected to the reinforced concrete substructure 101 of the house 100 and extended from the reinforced concrete substructure 101 to the outer periphery.

A shelter 1 according to a second embodiment of the present invention will be described with reference to FIGS. 1 to 6. The concrete foundation 2 may have a reinforced concrete structure.

The shelter main body 3 is connected to the concrete foundation 2, has a cylindrical iron plate 3a and a ceiling 3b made of an iron plate, and has a structure wherein the internal space 9 has a columnar structure. The outer surface of the shelter main body 3 is finished with a water-resistant coating. An inner hatch 5 made of an iron plate is connected to the periphery of an opening 4 provided in the ceiling 3b by hinges so that the inner hatch 5 can be opened and closed. A rising portion 6 rises upward from the periphery of the opening 4. An outer hatch 7 made of an iron plate is connected to the upper surface of the rising portion 6 by hinges 7a so that the outer hatch 7 can be opened and closed. The shelter main body 3 has a pair of rails 8 arranged in the vertical direction on the inner wall surface of the cylindrical iron plate 3a. A movable floor 10 is capable of moving up and down in the internal space 9 along the rail 8. The above will be described in detail below.

For example, the thickness of the iron plate of the shelter main body 3 is 9 mm, and preferably 6 to 12 mm.

It is preferable that an inner hatch fixing rod 11 for supporting the inner hatch 5 and having a structure capable of expansion and contraction is provided in the vertical direction. As shown in FIG. 6(a), it is fixed to the inner wall of the cylindrical iron plate 3a at normal times. In use, with the inner hatch 5 closed, the inner hatch fixing rod 11 penetrates a notch 10a of the movable floor 10, stands upright in the vertical direction, and supports the rear surface of the inner hatch 5 from below. The upper end portion 22 of the inner hatch fixing rod 11 supports the rear surface of the inner hatch 5 from below. The lower end portion of the inner hatch fixing rod 11 contacts with the bottom surface of the shelter main body 3. As shown in FIG. 3(a), for help of opening and closing, the inner hatch 5 is connected to a string or a chain 12 hung on the lower surface of the ceiling 3b via a hanging part 13 (a pulley or a sprocket). End portion of the string or chain 12 constitutes an operation part 14. By pulling down and releasing the operating part 14, the inner hatch 5 closes and opens. Opening and closing of the inner hatch 5 does not interfere with a mechanism 15. The inner hatch 5 may slide for opening and closing.

The outer hatch 7 and the movable floor 10 are connected by the link mechanism 15 so that the outer hatch 7 is interlocked with the movable floor 10 when the movable floor 10 moves up and down. The link mechanism 15 includes two arms with a universal joint. The outer hatch fixing member 16 is fixed to the outer surface of the ceiling 3b so that the outer hatch 7 can be detachably fixed to the outer hatch fixing member 16 in the standing state when the outer hatch 7 is opened. The outer hatch 7 is a hatch type opening and closing structure. The outer hatch 7 is preferably a double structure of an iron plate and a fireproof board.

A safety sensor (not shown) is installed in the opening/closing part of the outer hatch 7.

The movable floor 10 can be raised and lowered from the upper stage to the middle stage of the internal space 9 of the shelter main body 3. As shown in FIG. 6(b), a fixed floor plate 17 is fixed to the middle stage of the inner wall of the cylindrical iron plate 3a, and the movable floor 10 can be positioned so as to close an opening 17a thereof and so as to be in the same plane with the fixed floor plate 17. Therefore, a gap 18 is formed, which is set to a size such that a person can get down to the lower stage through it.

In order to support the movable floor 10, floor plate supporting pipes 19 are fixed to the movable floor 10. The end portions of the floor plate supporting pipes 19 have a structure capable of engaging with the teeth of the rails 8 for moving the movable floor. Therefore, the movable floor 10 can be gently raised and lowered. The movable floor 10 can move on the rails 8 and descend to 1400 mm. The power of the movable floor 10 is electrically driven (driven by a battery). When the movable floor 10 cannot be driven electrically, a manual crank 20 is provided. As shown in FIG. 2, floor plate fixing pipes 21 are provided horizontally, and the movable floor 10 can be supported when the movable floor 10 is in the upper stage. With the movable floor 10, the internal space 9 has a two floor structure, and the internal space 9 is partitioned into upper and lower parts so that people can go up and down.

As an example of the dimensions of the shelter 1, a height; 3, 100 mm, an outer diameter (diameter); 140 mm, a height of the cylindrical iron plate 3a; 2,800 mm, a height of the rising portion 6; 300 mm, a longitudinal width of the outer hatch 7; 900 mm, a width of the outer hatch 7; 700 mm, for example. It can accommodate up to four adults in the internal space 9. Expansion is possible when increasing the number of people to be accommodated.

The shelter 1 is designed such that the outer hatch 7 and the inner hatch 5 can withstand a water pressure of 200 kN/m² at a water depth of 20 meters. It can also withstand typhoons and tornadoes. The outer hatch 7 and the inner hatch 5 provide a double hatch structure to withstand the impact of the colliding objects caused by a tsunami, thereby improving the impact resistance.

For designing the structure of the shelter 1, the calculations of the main body 3 is performed based on the conditions that the shelter main body 3 is subjected to a vertical load and a tsunami load. The calculation of the foundation is performed based on the condition that the shelter main body 3 is installed to the foundation and is subject to a vertical load. Based on the calculation at the time of tsunami loading, concrete casting around the main body and connection with the peripheral foundation can be performed. In addition, the tsunami wave pressure formula is calculated according to the new guidelines such as the Tsunami Disaster Prevention Community Renovation Law announcement etc. The calculation of the foundation is performed according to the calculation formula used for the underground embedded foundations of road signs.

It is preferable to set the building area within 10 m² (for example, 9 m²) where building confirmation application is unnecessary. The size of the shelter main body 3 is calculated assuming the necessary space as 1.5 m³ per person. It is supposed to accommodate four people for general families. 4 people×1.5 m³=6.0 m³. It is possible to change the size of the shelter main body according to the conditions such as the existing building and number of people to be accommodated.

Although the case of embedding the shelter in the outdoor of the building is shown, it is also applicable to the case of being installed inside the building.

The planar installation position of the shelter main body 3 is selected from places that are easy to jump in immediately when evacuating such as places next to a front door, a front yard, etc. When the site is wide, it is bonded to an existing concrete structure other than the foundation of the building. The reason is to increase resistance against the moment of a tsunami.

An oxygen cylinder is prepared in the shelter main body 3. By blowing out oxygen, the interior pressure rises.

As the content of oxygen in the shelter is not enough for oxygen aspiration, oxygen is supplied from the oxygen cylinder which is installed in advance. Capacity of the oxygen cylinder is designed to be enough for living inside the shelter depending on the conditions such as the number of people to be accommodated, children or adults and so on.

In order to ensure adequate oxygen concentration, the concentrations of oxygen and carbon dioxide necessary for maintaining safe and secure living comfort within the shelter 1 can be detected by the concentration meter in the room. When the concentration deviates from an appropriate reference value, it is possible to adjust the oxygen concentration by injecting the installed oxygen can. Likewise, the concentration adjustment of carbon dioxide is possible. Target value of the oxygen concentration inside the shelter is 19%. Examples of necessary devices include an oxygen supply device set, an atmospheric pressure adjustment device, a carbon dioxide reduction device set, and the like.

A pressure reduction valve that decreases the pressure of the gas inside the shelter main body 3 is installed. Parts of water supply are also provided. In order to prevent excessive increase of carbon dioxide, carbon dioxide is adsorbed by slaked lime water solution or zeolite to reduce carbon dioxide. Since the storage battery is fully charged by the photovoltaic power generation panel, the storage battery continues to drive the slaked lime pump.

There are multiple (in this example, two) monitors to see the outside. As the monitors does not work in the middle of the night due to darkness, a thermometer is set outside so as to monitor the outside. Outside air temperature, inside air temperature, oxygen concentration, and carbon dioxide concentration can be recorded every predetermined time (for example, 30 minutes). In the case of midwinter, the temperature of the outside air thermometer rises as the tsunami intrudes, the judgement can be done whether or not the tsunami came even in the middle of the night.

The shelter main body 3 has a communication function such as a mobile phone, a satellite phone, a transceiver, etc, simple toilet, AED, and disaster prevention goods etc.

Next, the construction method is explained. Basically, it is assumed that the removal of the floor and the foundation has been completed in the construction work. When installing the main body, a hole having a size larger than the external dimensions of the main body of the underground evacuation shelter 1 both in the vertical and horizontal directions is dug on the ground. The depth is not constant due to a relation between the concrete foundation 2 and the earth pressure, but excavation is carried out based on the above calculation formula. Depending on the case of preliminary survey, it may be necessary to carry out earth retaining work. When an earth retaining work is necessary, it should be carried out simultaneously.

Ground is dug to a prescribed depth using human power and ultra small excavator. The dig work should be carried out paying attention to the behavior of the main body of the building. Especially careful attention is required to the depth of dig. After the dig is completed, pressure is applied by the engine type plate, and then the crushed stone is layered. As the material of the crushed stone, recycled aggregate of JIS standard RC 25 is used. After flattening the crushed stone, the engine plate performs surface compaction for flattening.

Subsequently, the concrete foundation 2 is constructed. If necessary, the rebars of the concrete foundation 2 is connected with the reinforced concrete substructure 101 of the house 100 with rebars, before concrete is cast. Concrete material is ordinary Portland cement. If shortening of construction schedule is necessary, rapid strength concrete shorten curing time. Basically it is on-site construction. Surface protecting concrete is placed on the concrete foundation 2. Concrete material may be ordinary Portland cement.

The concrete foundation 2 may be reinforced by placing a winged steel pipe pile like a screw pile in the earth. This not only supports the shelter 1 but also prevents it from collapsing.

The shelter main body 3 is constructed after concrete is hardened. In the case of on-site construction, concrete is cast after constructing rebars.

The shelter main body 3 is constructed by on-site construction, but it may be precast concrete manufactured at factory. Since this part is heavy, it is carried in with a truck crane. The shelter main body 3 is installed in accordance with the entrance anchor which is buried in the foundation concrete 2 in advance. After installation, it is fixed with nuts. The nuts are uniformly fastened by a torque type wrench.

Next, the inner hatch 5 is attached to the opening 4, and an outer hatch 7 which is a hatch made of fireproof steel is attached to the rising portion 6.

Figure 7:
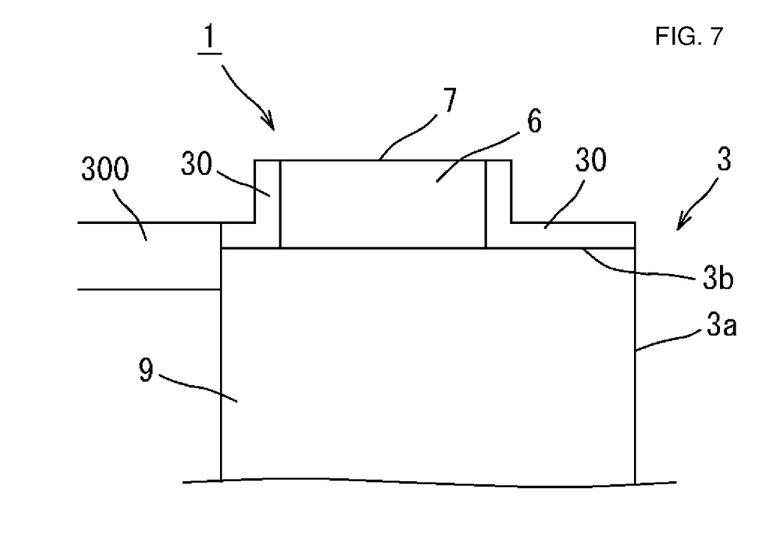
FIG. 7 is a front view of the upper part showing a modification of the underground evacuation shelter 1 according to the embodiment of the present invention.

FIG. 7 shows a modification of the above embodiment, in which a reinforced concrete 30 coupled to a reinforced concrete structure 300 is constructed. The thickness is preferably 10 cm to 30 cm. It is preferable to construct the reinforced concrete 30 on the upper surface of the ceiling 3b and the side surface of the rising portion 6. The rebars of the reinforced concrete 30 are welded and fixed to the outer surface of the rising portion 6 and the ceiling 3b. The rebars of the reinforced concrete 30 are joined to the rebars of the reinforced concrete structure 300 by welding or the like.

The effect of this embodiment will be described.

Since the movable floor 10 is provided in the internal space 9, a person inside can move easily, and the internal space can be used efficiently.

Since the outer hatch 7 and the movable floor 10 are connected by the link mechanism 15, the opening and closing efficiency of the outer hatch 7 is increased.

Since the inner hatch fixing rod 11 for supporting the inner hatch 5 is provided, it is possible to prevent the inner hatch 11 from unexpectedly opening and closing, which is highly safe.

The shelter 1 stay in the place where people evacuate to and can withstand secondary disasters such as tsunami, fire, and debris flow, as well as earthquake. Elderly and physically disabled people can safely evacuate. Innovative and more reliable performance highly necessary in modern society is offered.

It is possible to provide a safe shelter with a reduced construction cost and a shortened construction period. In addition, it can be made compact and the construction area of the shelter can be made small. It is possible to omit the application for confirmation to the city government and to reduce the time and labor for building. Furthermore, people can go in and out via above-ground part by opening the outer hatch 5 and the inner hatch 5 which are hatches of fireproof steel. The size of the opening 4 can be increased. As a barrier-free structure, the disabled people can evacuate by covering the floor with a board.

The shelter can be constructed as a set with a house so that the cost can be reduced. For example, it is possible to reduce the cost so that people in income groups with an annual income of 3 million to 4 million yen can afford a safe house with a shelter at a price comparable to that of a rental house. Further, for example, it is possible to reduce the cost to such an extent that the construction cost is less than 3 million yen. The cost can be further cut down by using subsidies. By adopting a structure integrated with the reinforced concrete substructure 101 of the house 100, it is possible to aim for dissemination by reducing the cost as compared to the cost for constructing a shelter alone. For example, it is possible to sell a house of a total floor space of 33 tsubo(109 m$^2$), with an evacuation shelter in the garden attached thereto, at the 16 million yen level. This is equivalent to the selling price of the residential part of the average spec houses. Housing with added value of an evacuation shelter is expected to be monetized. Above all, it also contributes to the national mission and role of protecting as many lives as possible. In addition, considering land information as one of the commercial items for these people, a set of a house, land information and a shelter is vendible. Furthermore, by reducing the foundation pile, cost reduction is possible.

By making the shelter main body 3 compact, it is possible to reduce the construction area of the shelter. It is thus possible to omit application for confirmation to the city government and to reduce time and labor for building.

The shelter 1 is adjacent to the house 100 such as their own home so that people can go in and out from the above-ground in an emergency to evacuate immediately. Even in an emergency, people can evacuate within 1 minute to 3 minutes. Even elderly people, physically disabled people and infants can evacuate within 3 minutes from the occurrence of an earthquake warning. Even if the shelter is submerged by tsunami, oxygen and other things necessary for life support can be maintained for at least 3 days. It is thus possible to provide an environment to live safely and securely.

In particular, it is possible to provide a safe and secure housing without tsunami concern for people who reside or live in the future in coastal areas.

Water pressure resistance performance is 2 atm (corresponding to water depth of 20 m) and an air conditioning function such as oxygen is provided assuming when the shelter is submerged. For example, food and water sufficient for four adults to live in the shelter for at least 3 days can be stored.

If the shelter main body 3 is precast concrete, it is possible to omit the labor of making, dismantling, and removing, and disposing a temporary frame. In this case, cost can be greatly reduced if the shelter main body 3 is manufactured by casting concrete on a stack of circular tubes which are made of circular tubes or single pipes used for the scaffolding of construction work by bending them into a shape such as a circle. In order to secure the strength of the shelter main body 3, at least one single straight pipe may be disposed at a position across the inner wall of the shelter main body 3 from the upper end surface to the lower end surface of the shelter main body 3.

Since the reinforced concrete 30 and the reinforced concrete structure 300 are connected to each other, sinking of the shelter 1 can be prevented.

Since the outer hatch 7 has a dual structure of a fireproof board of an iron plate, fireproof performance is enhanced. Since the upper part of the shelter 1 is covered with the reinforced concrete 30, the strength and the fireproof performance are improved.

By descending the movable floor 10, it is possible for a person to move while riding on the movable floor 10 and to partition the internal space 9 into two floors.

As the outer hatch 7 is interlocked with the movable floor 10, the outer hatch 7 can be automatically closed.

By supporting the inner hatch 5 with the inner hatch fixing rod 11, safety can be improved.

INDUSTRIAL APPLICABILITY

Evacuation shelters for household use can be provided at low cost with a shortened construction period, and it is possible to provide a safe and secure environment against tsunami, fire, tornado, and the like. Especially in coastal areas, its industrial utility value is great.

SIGNS LIST

1: an underground evacuation shelter
2: a concrete foundation
3: a shelter main body
100: a house
101: a reinforced concrete substructure
200: a parking lot
201: an automobile
300: a reinforced concrete structure
400: a fence
3a: a cylindrical iron plate
3b: a ceiling
4: an opening
5: an inner hatch
6: a rising portion
7: an outer hatch
7a: a hinge
8: a pair of rails
9: an internal space
10: a movable floor
10a: a notch
11: an inner hatch fixing rod
12: a string or a chain
13: a hanging part
14: an operating part
15: a link mechanism
16: an outer hatch fixing member
17: a fixed floor plate
17a: an opening
18: a gap
19: a floor plate supporting pipe
20: a manual crank
21: a floor plate fixing pipe
30: a reinforced concrete

The invention claimed is:
1. An underground evacuation shelter, comprising:
a shelter main body connected to a concrete foundation, said shelter main body having a frame of a columnar structure and a ceiling, and an internal space of said shelter main body having a columnar structure shape;
a hatch of a double structure including an outer hatch and an inner hatch, the inner hatch connected a to periphery of an opening provided in said ceiling via at least one hinge so that the inner hatch opens and closes the opening provided in said ceiling;

a movable floor capable of ascending and descending inside said internal space along rails arranged vertically on inner wall surfaces of said shelter main body, wherein said internal space is partitioned into two floors by said movable floor; and an inner hatch fixing rod arranged in a vertical direction for supporting said inner hatch, said inner hatch fixing rod having a structure capable of expansion and contraction, said inner hatch fixing rod passing through and penetrating a notch of said movable floor, an upper end portion of said inner hatch fixing rod supporting said inner hatch, and a lower end portion of said inner hatch fixing rod being in contact with a bottom surface of said shelter main body.

2. The underground evacuation shelter according to claim 1, wherein said outer hatch and said movable floor are connected by a link mechanism, and said outer hatch is interlocked with said movable floor via the link mechanism while ascending and descending of said movable floor.

3. The underground evacuation shelter according to claim 1, wherein said movable floor is movable up and down from an upper stage to a middle stage of said shelter main body.

4. The underground evacuation shelter according to claim 1, wherein said outer hatch is connected to a rising portion by another hinge in an openable and closable manner, and the rising portion is formed upwardly from the periphery of the opening provided in said ceiling.

* * * * *